Patented Aug. 24, 1954

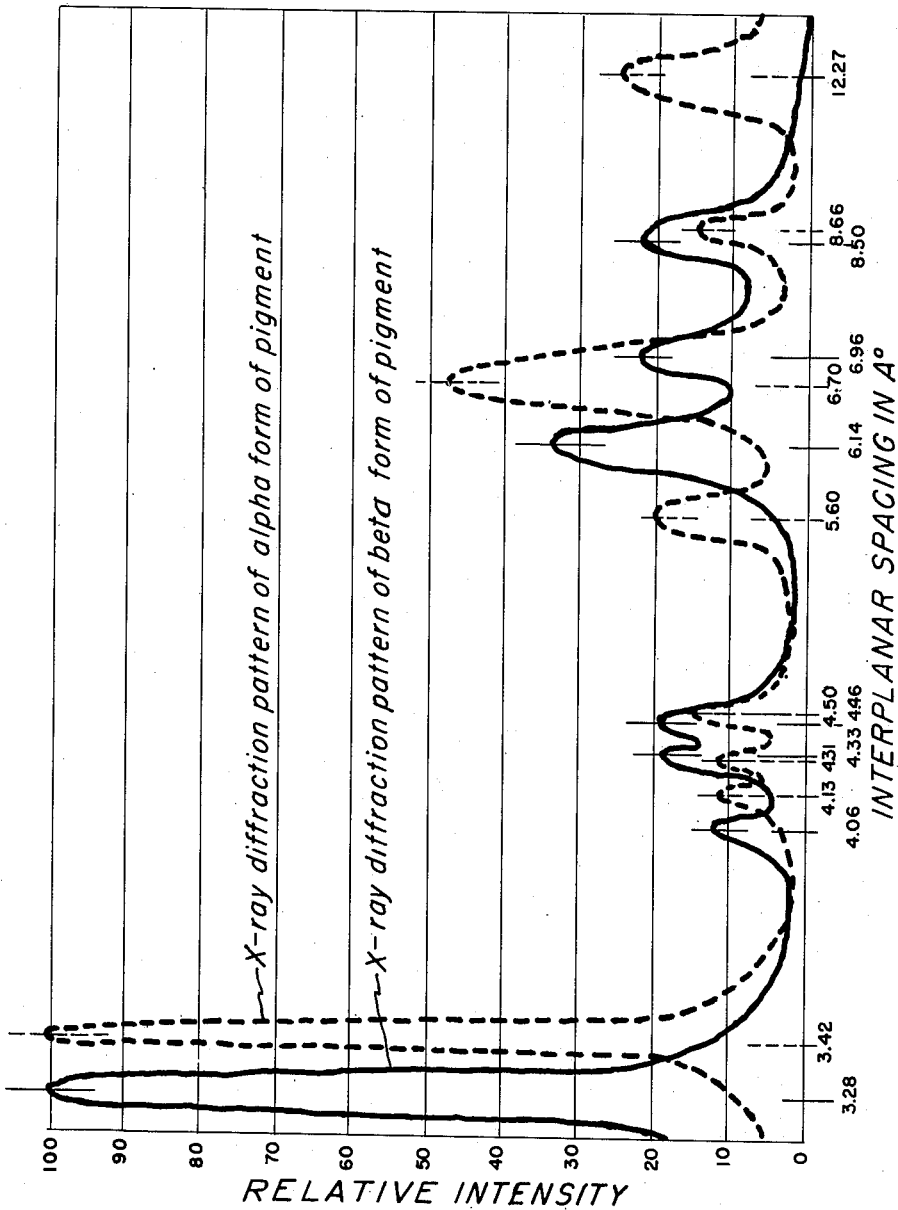

2,687,410

UNITED STATES PATENT OFFICE 2,687,410

AZO PIGMENT

Albert R. Hanke, Westfield, N. J., assignor to E. I. du Pont de Nemours and Company, Wilmington, Del., a corporation of Delaware Application December 26, 1951, Serial No. 263,288

7 Claims. (Cl. 260—204)

This invention relates to a new azo pigment and process for producing the same. More particularly, it relates to the production of a yellowish-hued, light maroon-colored azo pigment that is of excellent lightfasteness and durability in coating compositions, and is relatively free from bleeding in such compositions.

The large class of azo pigments obtained by coupling diazotized aromatic amines with arylides of 3-hydroxy-2-naphthoic acid has been known for many years, and a large number of such pigments are well known in the art as pigments of value in coating compositions. As a class, such pigments have relatively good lightfastness and durability on exposure to the elements when incorporated in coating compositions comprising alkyd resins, nitrocellulose, and the like. Nevertheless, there are wide variations in these properties between different compositions within this class and such variations are sufficient to make the difference between their success or failure as commercial pigments. Likewise, there are wide variations in the hues resulting from the many possible substituents which may be added to the basic azo pigment skeleton of this class of compounds. Combinations of desirable hue and satisfactory resistance to the elements have not always been found and constant search has gone on for better products considering all of the properties thereof.

Thus, the azo dyestuff obtained by coupling diazotized p-chloro-o-nitraniline with the o-anisidide of 3-hydroxy-2-naphthoic acid having the following structural formula:

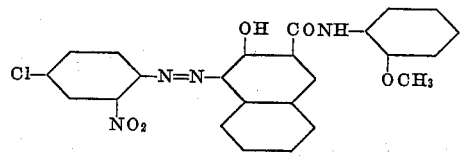

has been commercially exploited for use in automotive enamels and lacquers. It has excellent lightfastness and has shown a high degree of resistance to the elements when incorporated in coating compositions such as alkyd resin enamels, nitrocellulose lacquers, and the like. Although all pigments of this class show some tendency to bleed in compositions such as those mentioned above, this pigment shows a markedly lower tendency to bleed than do most of the class. The use of this product has been restricted, however, to those situations wherein its characteristic relatively dark bluish-maroon shade was desired. Products tending toward a more yellow shade of dark red or maroon but at the same time retaining all the desirable properties of lightfastness, resistance to the elements, and resistance to bleeding have been notably lacking.

It is an object of this invention to provide a yellowish-hued, light maroon-colored azo pigment that is of excellent lightfastness and durability when incorporated in coating compositions.

It is another object of this invention to produce such a pigment from the dark bluish-maroon pigment obtained by coupling diazotized p-chloro-o-nitraniline with o-anisidide of 3-hydroxy-2-naphthoic acid.

Other objects of this invention will appear hereinafter.

These objects may be accomplished, in general, by coupling diazotized p-chloro-o-nitraniline with o-anisidide of 3-hydroxy-2-naphthoic acid, treating the resulting pigment with a solvent therefor, and reducing the particle size of the resulting crystals to a finely comminuted form.

More specifically, it has been found in accordance with this invention that when the dark, bluish-maroon pigment obtained by the above-mentioned coupling procedure is heated in dilute suspension in a solvent for the pigment such as chloroform, trichloroethylene, trichlorobenzene, methylene chloride, monochlorbenzene, carbon tetrachloride, acetone, glacial acetic acid, or the like, it rapidly undergoes transformation to a noticeably yellower form accompanied by a marked increase in the size of the crystals and a corresponding decrease in pigment strength. Examination of the new crystals by X-ray powder diffraction techniques shows a distinctly new pattern indicative of a new crystal form. When these large crystals of the new crystal form (herein called the "beta" form in contrast to the original or "alpha" form) are subjected to particle size reduction, e. g., by grinding, particularly by the salt milling methods of U. S. 2,402,167, a desirable new pigment is produced, chemically identical to the original pigment but showing a distinctive X-ray diffraction pattern, differing markedly in hue but retaining the desirable lightfastness, resistance to bleeding, and durability of the original pigment.

Furthermore, by a modification of the process in which the salt milling is conducted in the presence of a small amount of chlorinated hydrocarbon solvent, for example, chloroform, insufficient to make the mass noticeably wet, both the crystal phase change and the particle size reduction can be accomplished in one relatively simple operation.

The accompanying drawing discloses, as Figure 1, in graphic illustration, in which the relative intensity of diffracted energy is plotted against the interplanar spacing in Angstrom units, the difference between the X-ray diffraction patterns of the alpha and beta forms of the above-described azo pigment crystals.

The following examples are given to illustrate certain preferred detailed procedures of the process of this invention.

EXAMPLE I

*Preparation of azo pigment in alpha phase*

One hundred seventy-two and one-half pounds (172.5 lbs.) (1 mol) of para-chloro-ortho-nitraniline is wet up by stirring into 200 gallons of water. One hundred and nine pounds (109 lbs.) of hydrochloric acid (100%) is then added and the volume adjusted to a total of 300 gallons with water and ice to give a temperature of about 10° C. A solution of 70 pounds of sodium nitrite in 20 gallons of water is then added over a period of about 30 minutes and the mixture stirred about one hour at 10° C. until diazotization is complete.

In a separate vessel, 293 pounds of the o-anisidide of 3-hydroxy-2-naphthoic acid is wet up by stirring into about 200 gallons of water containing 16 pounds of para soap. When thoroughly wet, a solution of 80 pounds of caustic soda in about 10 gallons of water is added and the mixture stirred for 10 to 15 minutes to a clear brown solution. It is then diluted with water to a volume of about 1500 gallons, a solution of 82 pounds of sodium acetate in 50 gallons of water is added and the temperature adjusted to 45° C.

Coupling is then brought about by adding the diazo having a temperature of about 10° C. beneath the surface of the o-anisidide of 3-hydroxy-2-naphthoic acid solution in the coupling vat having a temperature of 45° C. over a period of about 30 minutes. The final pH should be 5.4 to 5.8. After stirring about one hour at 45° C. it is then heated to boiling over a period of about one hour. After boiling ten minutes, it is cooled slightly, filtered while still hot, washed with water to free it of soluble salts and dried at 60° C. to give 465 pounds of a dark, bluish shade maroon pigment exhibiting a characteristic X-ray diffraction pattern as shown by the dotted line in Figure 1. This crystal form has been designated the alpha phase.

EXAMPLE II

*Phase conversion*

One hundred and seventy-five pounds (175 lbs.) of chloroform is added to a suitable vessel of about 75 gallons capacity designed for heating externally (such as with a steam jacket) and equipped with a condenser for reflux. One-half pound of the pigment of Example I, in finely pulverized form, is then added and the chloroform heated to reflux with agitation over a period of about one and one-half to two hours. At this point a second increment of one-half pound of pigment is added. The mixture is maintained at the temperature of refluxing and the third and fourth increments of one-half pound pigment each are added at intervals of about one hour. Heating under reflux is continued for a period of four hours and the chloroform then removed by distillation to leave a pigment which is lighter and yellower than the original but also significantly larger in particle size and correspondingly weaker in tinctorial value. It exhibits a characteristic X-ray diffraction pattern which is different from that of Example I and is shown by the solid line in Figure 1. This crystal form is designated as the beta form.

EXAMPLE III

*Phase conversion by recrystallization*

A portion of the pigment of Example I is placed in the thimble of a Soxhlet extractor containing tetrachloroethylene and subjected to continuous extraction until sufficient pigment has accumulated in the reservoir of solvent to result in the formation of crystals on cooling. These crystals, when examined by X-ray diffraction, exhibit the pattern characteristic of the beta phase as shown by the solid line in Figure 1.

EXAMPLE IV

*Particle size reduction*

The pigment of Example II is salt milled by adding two and one-half pounds to a 25-gallon ball mill containing a charge of 380 pounds of steel balls of mixed sizes (mostly 0.5 inch diameter) and 22.5 pounds of oven-dried sodium chloride, and rotating the mill for three days. The milled charge is separated from the balls and extracted by slurrying in hot dilute hydrochloric acid (4.5 pounds of 100% hydrochloric acid in 25 gallons of water), filtering, washing free of soluble salts, and drying at 60° C. The resulting pigment is a light, yellowish maroon of good strength, excellent lightfastness and durability when used in automotive enamels and the like, and exhibits the typical beta phase X-ray diffraction pattern as shown by the solid line in Figure 1.

EXAMPLE V

*Phase conversion and particle size reduction in one operation*

Two and one-half pounds (2.5 lbs.) of alpha phase pigment of Example I is added to a 25-gallon ball mill containing a charge of 380 pounds of steel balls of mixed sizes and 22.5 pounds of oven-dried sodium chloride. One-half pound of chloroform is then added and the mill is sealed and then rotated for 16 hours. The pigment charge is separated from the balls and extracted as in Example IV. The resulting dry pigment resembles that of Example IV in every way, being a highly valuable light, yellowish shade maroon, exhibiting the X-ray diffraction pattern as shown by the solid line of Figure 1.

The particular mechanism of the reaction involved in the process of this invention is not definitely known. It appears that reaction is dependent upon the solvent action of the solvent on the alpha form of the pigment. Where complete solution of the pigment has been effected, as in the Soxhlet extractor of Example III, any liquid which exerts sufficient solvent action on the pigment to effect a crystal formation in the solution upon cooling appears to convert the alpha phase of the pigment to its beta phase.

The following liquids have been found to be effective in this way:

Chloroform
Trichloroethylene
Tetrachlorethane
Carbon tetrachloride
Acetone
Glacial acetic acid
Acetic anhydride In a simple reflux procedure as described in Example II, where complete solution is not necessarily brought about, some liquids have been found more effective than others, the following show particular value for this use:

Chloroform
Trichlorethylene
Methylenechloride
Trichlorbenzene
Monochlorbenzene
Acetic anhydride It is also known that the concentration of the pigment in the solvent plays a significant role in the method by reflux. Thus 0.5 gram of pigment per 100 milliliters of chloroform gives a rapid phase conversion, whereas 0.8 gram of pigment per 100 milliliters of chloroform does not allow phase conversion. In general, the concentration of pigment in solvent should not exceed about 0.4% by weight of unconverted alpha phase material. When the pigment is added stepwise as in Example II, the total ratio of pigment to solvent may be greater but the ratios in the individual steps must fall within the aforesaid limit.

In the salt-milling procedure for reducing particle size after phase conversion and crystal growth, the conditions of U. S. 2,402,167 apply and are not otherwise critical. In general, the charge of sodium chloride should be above four parts per part of pigment and, for economic reasons, should not appreciably exceed about ten parts per part of pigment. The time of milling will vary with different mills and mill loading, and the optimum time is easily determined by trial.

In the method of simultaneously effecting phase conversion and particle size reduction, as in Example V, the usual salt milling conditions apply, the only variation being in the addition of a small amount of crystallizing solvent. The nature of the solvent is limited only by the requirements that it be an effective crystallizing solvent and that it not be so volatile that it cause excessive pressure in the ball mill. It is also desirable, though not essential to the invention, that it be non-inflammable. Chlorinated hydrocarbon solvents and particularly chloroform and trichlorethylene fulfill these requirements admirably. The amount of solvent is preferably limited to that which will not give any evidence of a pasty or cohesive mass in the mill. About 1% to 3% of the combined weight of the pigment and salt, or about 10% to 30% based on the weight of the pigment alone, is a satisfactory amount. Significantly, higher amounts may cause packing in the mill and lower amounts increase the time required to give effective phase conversion and may result in only a partial conversion.

The X-ray data referred to above were obtained by the well-known powder diffraction methods and were recorded as continuous curves with a Geiger counter in terms of the amount of diffracted energy vs. the angle of diffraction. The super-imposed curves shown in Figure 1 are based upon the relative intensities adjusted so that the strongest line in each case is represented as 100. The following table shows the three strongest lines in each case characterized by their interplanar spacings, in terms of angstrom units.

|  | Alpha Phase | Beta Phase |
| --- | --- | --- |
| Strongest | 3.42 | 3.28. |
| Second | 6.70 | 6.14. |
| Third | 12.27 | {6.96} {8.50} equal intensity. |

Although a specific method of preparation of the alpha phase prior art pigment has been given, it is illustrative and conventional only and not, in any way, a part of this invention which lies exclusively in the conversion of this old pigment, however prepared, into a new and novel crystal form of the same chemical composition. For instance, the rate and time of heating, the temperature of coupling, and the like, markedly influence the tinctorial properties of the prior art pigment. Such differences in the properties of the prior art pigments are not reflected, however, in the pigment resulting after the phase conversion of the crystal, the resulting product being uniformly a light maroon of yellowish hue.

Reference in the specification and claims to parts, proportions and percentages, unless otherwise specified, refers to parts, proportions and percentages by weight.

Since it is obvious that many changes and modifications can be made in the above-described details without departing from the nature and spirit of the invention, it is to be understood that the invention is not to be limited to said details except as set forth in tthe appended claims.

I claim:

1. As a new yellowish-hued, light maroon-colored azo pigment, the beta crystal form of diazotized para-chloro-ortho-nitraniline coupled with the ortho-anisidide of 3-hydroxy-2-naphthoic acid characterized in that when exposed to X-rays it exhibits an X-ray diffraction pattern in which the line of maximum intensity corresponds to an interplanar spacing of about 3.28 Å., in which the second most intense line corresponds to an interplanar spacing of about 6.14 Å., and in which the third most intense lines are two of about equal intensity corresponding to interplanar spacings of about 6.96 Å. and 8.50 Å.

2. The process of producing a crystal form of pigment having a relatively light maroon shade of yellowish hue which comprises converting to a new beta crystal phase the alpha crystal phase of the pigment obtained by coupling diazotized para-chloro-ortho-nitraniline with the ortho-anisidide of 3-hydroxy-2-naphthoic acid by subjecting the same to contact with an organic liquid exerting solvent action thereon, and salt milling the resulting large crystals to finely comminuted form.

3. The process of claim 2 in which the phase conversion takes place through complete solution of the pigment and subsequent recrystallization.

4. The process of claim 2 in which the phase conversion takes place through suspension of the pigment in the solvent liquid, and heating said liquid under reflux.

5. The process of claim 2 in which the phase conversion takes place through suspension of the pigment in the solvent liquid in a concentration of unconverted alpha phase pigment not to exceed about 0.4% by weight of said liquid, and heating said liquid under reflux.

6. The process of claim 2 in which the solvent liquid is taken from the group consisting of methylene chloride, chloroform, carbon tetrachloride, trichlorethylene and tetrachloroethylene.

7. The process of claim 2 in which the phase conversion and particle size reduction are effected simultaneously by salt-milling the pigment in the presence of an amount of a solvent therefor insufficient to give a pasty mixture.

References Cited in the file of this patent

UNITED STATES PATENTS

| Number | Name | Date |
|---|---|---|
| 2,124,590 | Reed | July 26, 1938 |
| 2,174,954 | Vesce | Oct. 3, 1939 |
| 2,402,167 | Lang et al. | June 18, 1946 |
| 2,517,924 | Powell | Aug. 8, 1950 |
| 2,573,851 | Lacey et al. | Nov. 6, 1951 |